Sept. 1, 1959  R. L. LICH  2,901,983
RAILWAY VEHICLE TRUCK

Filed July 21, 1955  3 Sheets-Sheet 1

INVENTOR
RICHARD L. LICH
BY Rodney Bedell
ATTORNEY.

Sept. 1, 1959   R. L. LICH   2,901,983
RAILWAY VEHICLE TRUCK

Filed July 21, 1955   3 Sheets-Sheet 2

INVENTOR
RICHARD L. LICH
BY Rodney Bodell
ATTORNEY

Sept. 1, 1959  R. L. LICH  2,901,983
RAILWAY VEHICLE TRUCK
Filed July 21, 1955  3 Sheets-Sheet 3

INVENTOR.
RICHARD L. LICH
BY
Rodney Bedell
ATTORNEY.

United States Patent Office 2,901,983
Patented Sept. 1, 1959

2,901,983

RAILWAY VEHICLE TRUCK

Richard L. Lich, St. Louis, Mo., assignor to General Steel Castings Corporation, Granite City, Ill., a corporation of Delaware Application July 21, 1955, Serial No. 523,496

17 Claims. (Cl. 105—199)

The invention relates to railway rolling stock and more particularly to the support of one end portion of the vehicle body upon a two-wheel or single axle truck.

The main object of the invention is to provide an economical mounting and, at the same time, effect suitable spring support for the vehicle body.

More detailed objects are to anchor a truck frame, which has a spring support for the body, to the body in such fashion that there will be no substantial swiveling movement of the truck and body relative to each other or transversely or longitudinally of the vehicle. Nor will the truck frame tend to rotate about the single axle.

More specifically, the truck is adapted for use in a caboose, which is a light weight vehicle, and carries a few trainmen. Usually such vehicles have been mounted upon two four-wheel trucks but equal, if not superior, riding qualities can be obtained by the use of the two-wheel truck here described.

Other detail advantages of the present structure will appear from the following description, reference being had to the accompanying drawings, in which:

Figures 2 and 3 each shows a portion of the vehicle body underframe.

Figure 1:
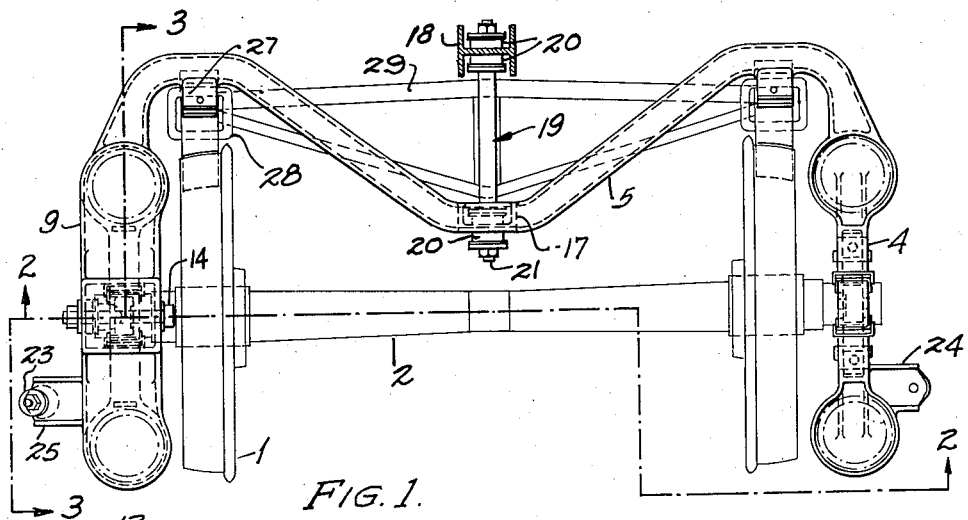
Figure 1 is a top view of a truck embodying the invention.
Figure 4:
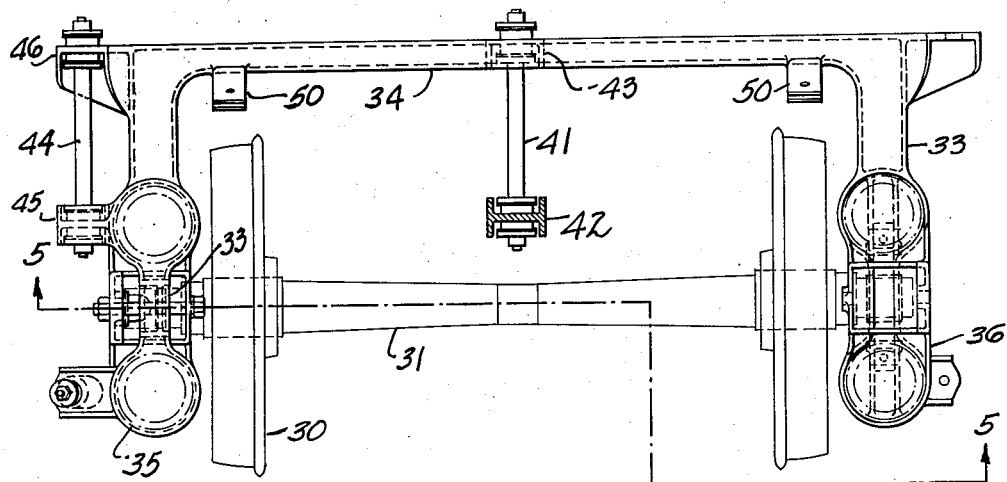

Figure 4 corresponds to Figure 1 but shows another form of the invention.

Figure 5:
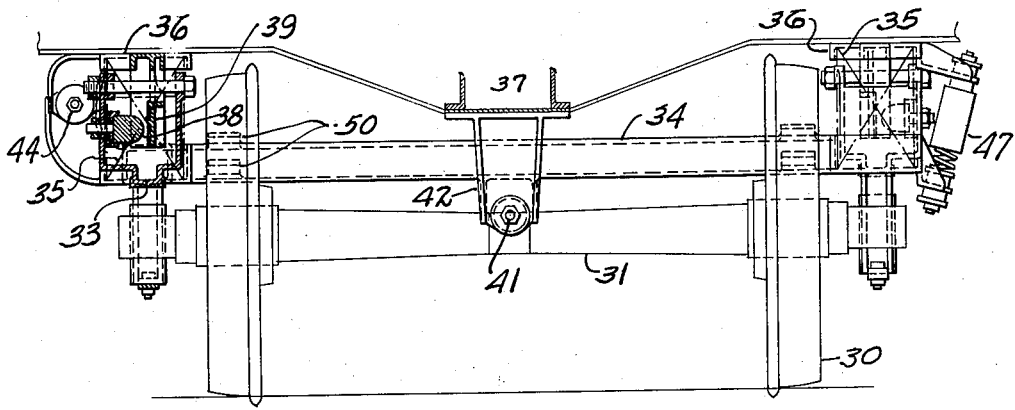

Figure 5 is a vertical transverse section on the line 5—5 of Figure 4.

Figure 6:
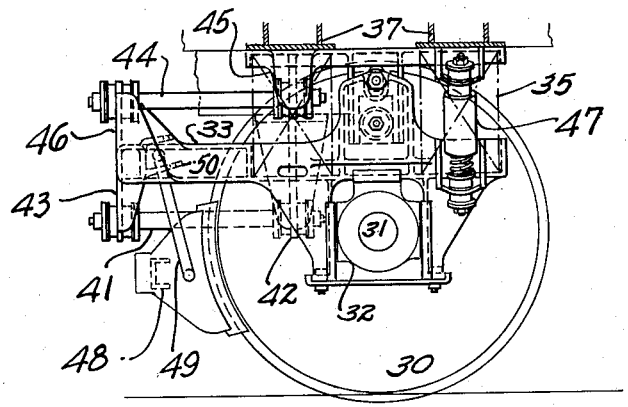

Figure 6 is a side elevation of the truck shown in Figures 4 and 5 and shows a portion of the vehicle underframe.

Figure 7:
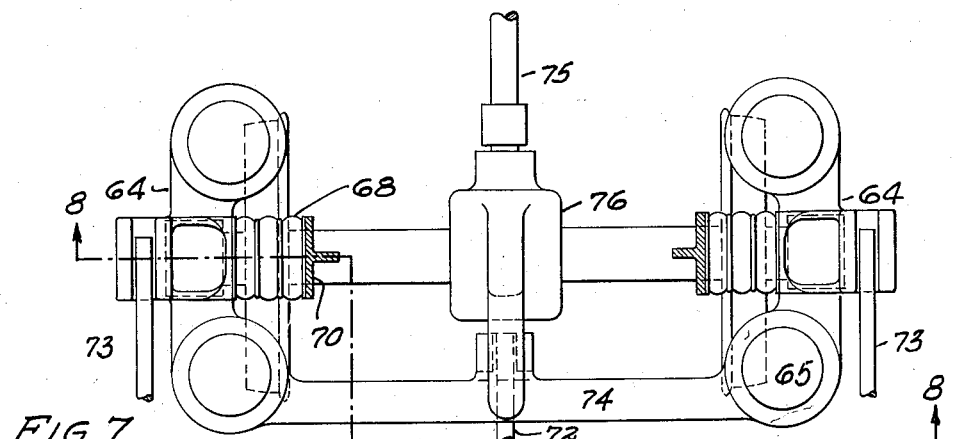

Figure 7 corresponds to Figures 1 and 4 but shows another form of the invention.

Figure 8:
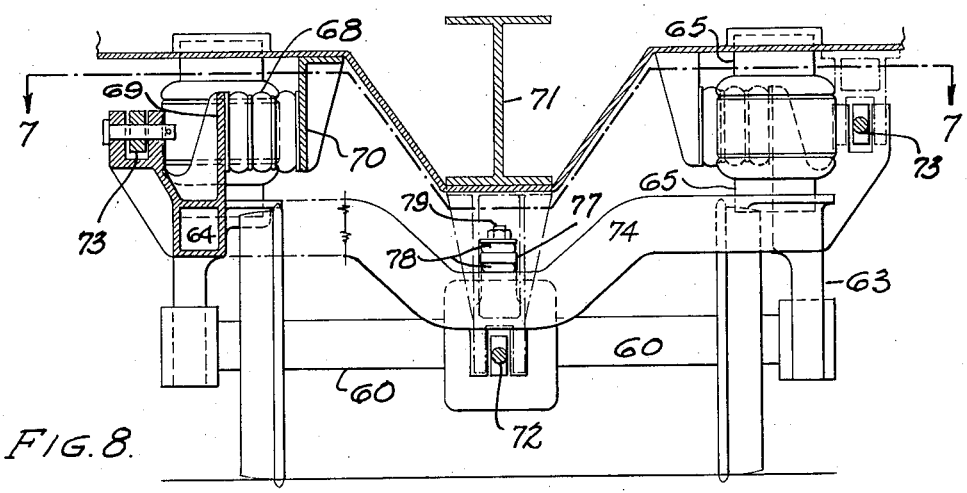

Figure 8 is a vertical transverse section on the line 8—8 of Figure 7 and shows a portion of the vehicle underframe.

Figure 9:
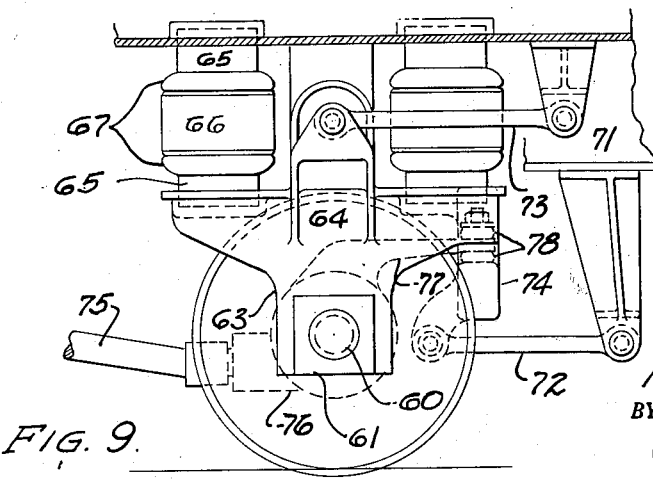

Figure 9 is a side elevation of the structures shown in Figures 7 and 8.

Figure 2:
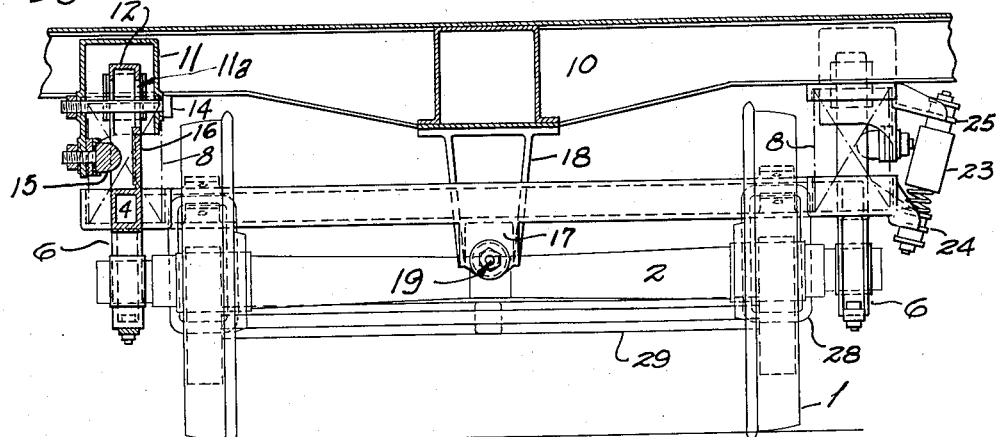
Figure 2 is a vertical transverse section and elevation on the line 2—2 of Figure 1.
Figure 3:
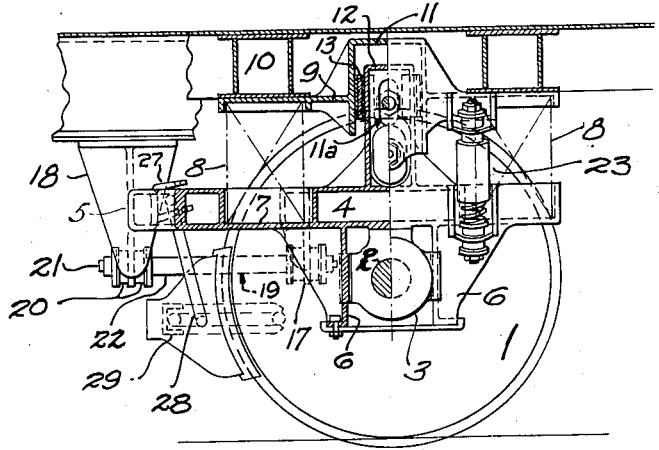
Figure 3 is a vertical longitudinal section on the line 3—3 of Figure 1.

In the truck shown in Figures 1, 2 and 3, wheels 1, axles 2, and journal boxes 3 are of usual construction. The truck frame comprises wheel pieces 4 and a transverse transomlike member 5 extending between and rigidly connecting a pair of corresponding ends of the wheel pieces. Pedestals 6 depend from each wheel piece and receive the corresponding journal box 3 and are fixed thereto and the boxes are held in alignment with each other. Preferably parts 4, 5, and 6 are cast integrally. Each wheel piece 4 is provided with spring seats 7 fore and aft of the axle and springs 8 are mounted on the wheel pieces. A spring cap 9 is carried by each pair of springs 8 and forms a support for the vehicle underframe 10. Cap 9 includes an inverted U-shape housing 11 slidably receiving an upstanding box-like member 12. Renewable wear plates 13 are applied to housing 11 and box 12. Elements 11, 12, 13 hold the wheel pieces and spring cap against movement longitudinally of the truck. A horizontal bolt 14 passes through opposing walls of box 12 and through a vertically elongated slot 11a in the spring cap and limits the spring thrust movement of the spring cap away from the wheel piece.

The width of housing 11 transversely of the truck is substantially greater than the width of box 12 and springs 8 will deflect transversely of the truck so as to yield to sudden shocks resulting from rail inequalities or like forces and thereby contribute to the easy riding of the vehicle body. Movement of the spring cap and body underframe transversely of the truck is limited by the opposition of rubber pads 15 to upstanding brackets 16 on the wheel pieces.

Depending from the middle portion of transom 5 is a bracket 17 and depending from body underframing 10 is a bracket 18 spaced longitudinally of the vehicle from bracket 17. An elongated anchor device 19 extends between brackets 17 and 18 and is of a type commonly used in railway truck construction for anchoring parts together to hold them against substantial movement in one direction while accommodating their relative movement in a transverse direction. In this type of anchor, rubber pads, as indicated at 20, are clamped against a web on one part by an over-all bolt 21 and an intermediate strut 22.

The provision of devices at different levels for limiting the relative movement of the truck frame and vehicle longitudinally of the truck prevents rotation of the truck frame about the truck axle and the single axle two-wheel truck provides the necessary stability and affords the required easy riding support for a light weight vehicle, such as a railroad caboose.

Friction or other type snubbers 23 are provided at opposite sides of the truck and are connected at their opposite ends to brackets 24 on the truck frame and 25 on the spring cap. Transom 5 has brackets 27 from which hangers 28 are suspended for carrying the brake beam 29. By offsetting the middle portion of transom 5 as best shown in Figure 1, the anchor 19 at the center of the car between the transom and the underframe bracket 18 may be positioned inwardly from the corresponding end of the truck and thus be more nearly in line, transversely of the truck, with the elements 11, 12 to more effectively stabilize the truck frame against rotation on its axle and also to conserve space beneath the vehicle body as may be required for auxiliary equipment.

In the truck shown in Figures 4, 5, and 6, the arrangement of wheels 30, axle 31, journal boxes 32, and wheel pieces 33 correspond generally to that previously described but the frame transom 34 extends in a straight line from wheel piece to wheel piece. Truck springs 35 and spring cap 36 form the yielding support for the vehicle body underframe 37 on the truck. Rubber bumper 38 on the wheel piece opposes a depending flange 39 on the spring cap to limit relative movement of the truck frame and body frame transversely of the vehicle. A centrally disposed anchor 41, with associated brackets 42 and 43, correspond to the centrally disposed low level anchor 19 and associated parts previously described. High level anchors 44 are positioned at each side of the truck and are connected to brackets 45 on the spring cap and brackets 46 on the wheel piece. Snubbers 47 control the action of springs 35. The brake beam (Figure 6) 48 is suspended by hangers 49 from brackets 50 (Figure 4) on transom 34.

Figures 7, 8 and 9 illustrate another form of the invention embodied in a powered truck in which the single axle 60 is journaled in boxes 61 fitted to pedestals 63 of the truck frame, which includes wheel pieces 64 connected by a transom 74. The wheel pieces form seats for air springs. Each air spring comprises an upper and lower metallic can or cylinder 65 and an intermediate cylinder 66 connected to the upper and lower cans by individual rubber bellows 67. This type of spring offers substantially no resistance against lateral forces and accordingly a horizontally acting air spring 68 is inserted between an upstanding web 69 on the truck frame and a depending web 70 on the vehicle body underframe, the central member of which is indicated at 71. The truck frame and vehicle body are anchored to each other at different levels centrally and at the side of the car by links 72 and 73, respectively. A drive shaft 75 extends from a reduction gearing indicated at 76 on axle 60 to a gasoline motor or other power source (not shown) supported by the vehicle body. A torque arm 77 on the reduction gearing housing is secured through rubber pads 78 and bolt 79 to truck frame transom 74.

Each of the structures described attains all of the objectives referred to in the introductory portion of the specification and it will be understood that the details may be varied other than as shown without departing from the spirit of the invention and the exclusive use of those modifications coming within the scope of the claims is contemplated.

What is claimed is:

1. In a railway vehicle, a vehicle body framing, a truck beneath one end of the same and comprising a single wheeled axle with journal boxes, a rigid truck frame carried on the journal boxes and holding them in axial alignment and comprising wheel pieces and a transverse transom connecting them, springs seated on the truck frame and supporting the vehicle body framing, devices positioned at the center and at each side of the truck and connecting portions of the vehicle body framing and the truck frame and holding the connected portions against relative movement lengthwise of the vehicle, the devices at the center and at the sides of the vehicle being at different levels, whereby the truck frame is held against rotation about the axle.

2. In a railway vehicle, an axle with wheels and journal boxes, a truck frame with wheel pieces mounted solely on the journal boxes and elongated lengthwise of the vehicle, there being a transverse transom rigidly connecting the wheel pieces, the wheel pieces, journal boxes, and transom being held against movement relative to each other, springs stably mounted on each wheel piece fore and aft of the axle, a body underframe supported on said springs, and elongated devices positioned at different levels and each connected at opposite ends to the truck frame and to the body underframe respectively, for anchoring the truck frame to the vehicle body to hold the truck frame and body against inclination in a vertical longitudinal plane, at least two of said devices being spaced apart transversely of the truck and holding the truck and body against relative rotation in a horizontal plane.

3. Railway vehicle structure according to claim 1 in which one holding device is associated with the intermediate portion of the transverse transom and other holding devices are associated with said wheel pieces.

4. Railway vehicle structure according to claim 1 in which a bracket depends from the truck frame, and an associated bracket depends from the vehicle body framing, said brackets being at the center of the vehicle and terminating below the level of the wheel pieces and forming portions of one holding device, and other members extend upwardly from the wheel pieces, there being associated members on the sides of the vehicle body framing, said members forming portions of other holding devices.

5. Railway vehicle structure according to claim 1 in which the truck frame includes a transverse transom connecting the wheel pieces and offset intermediate its ends toward the axle, and a holding device elongated lengthwise of the vehicle has one end connected to the offset portion of said transom and its other end connected to the body framing at a point abreast of the corresponding ends of the wheel pieces.

6. Railway vehicle structure according to claim 1 in which the devices holding the truck frame against rotation about the axle are positioned at one side of the axle, there being a snubbing device at the opposite side of the axle connecting the vehicle body and the truck frame.

7. Railway vehicle structure according to claim 1 in which the truck frame has upstanding brackets received in corresponding downwardly opening recesses in the body framing and positioning the truck and body horizontally relative to each other.

8. Railway vehicle structure according to claim 1 in which the holding devices comprise elongated anchors extending longitudinally of the vehicle and connected at their opposite ends to the truck frame and vehicle body respectively and being yieldable angularly of their axes but substantially resisting relative movement of parts they interconnect longitudinally of the vehicle.

9. Railway vehicle structure according to claim 1 which includes a drive shaft having an operating connection to the truck axle and extending therefrom to the vehicle body.

10. A railway vehicle truck comprising a single axle with wheels and aligned journal boxes, a truck frame with wheel pieces mounted on the journal boxes and elongated lengthwise of the truck, there being a transverse transom rigidly connecting the wheel pieces, said wheel pieces, journal boxes, and transom being held against movement relative to each other, devices at different levels and elongated lengthwise of the truck, each connected at one end to the truck frame and adapted at its other end for connection to a vehicle body to hold the same against relative movement lengthwise of the truck and to hold the truck frame against rotation about the truck axle, springs mounted on each wheel piece fore and aft of the axle, and a vehicle body-supporting spring cap carried on the springs on each wheel piece.

11. A railway vehicle truck comprising a single axle with wheels and journal boxes, a truck frame with wheel pieces mounted on the journal boxes, there being a transverse transom connecting the corresponding ends of the wheel pieces, said wheel pieces, journal boxes and transom being held against movement relative to each other, springs mounted on each wheel piece fore and aft of the axle, a spring cap supported thereby, vertically telescoping elements on the truck frame and spring cap holding them against relative horizontal movement, and means for anchoring each side of the truck frame to a vehicle body to hold the truck and body against relative movement lengthwise of the truck.

12. A railway vehicle truck comprising a single axle with wheels and aligned journal boxes, a truck frame with wheel pieces mounted on the journal boxes and elongated lengthwise of the truck, there being a transverse transom rigidly connecting the wheel pieces, said wheel pieces, journal boxes, and transom being held against movement relative to each other, devices at different levels and elongated lengthwise of the truck, each connected at one end to the truck frame and adapted at its other end for connection to a vehicle body mounted on the truck to hold the same against relative movement lengthwise of the truck and to hold the truck frame against rotation about the truck axle, a reduction gear housing mounted on the truck axle, and a torque arm extending from the reduction gear housing lengthwise of the truck and anchored to a portion of the truck frame spaced from the axle.

13. A railway vehicle truck comprising a single axle with wheels and aligned journal boxes, a truck frame with wheel pieces mounted on the journal boxes and elongated lengthwise of the truck, there being a transverse transom rigidly connecting the wheel pieces, said wheel pieces, journal boxes, and transom being held against movement relative to each other, devices at different levels and elongated lengthwise of the truck, each connected at one end to the truck frame and adapted at its other end for connection to a vehicle body mounted on the truck to hold the same against relative movement lengthwise of the truck and to hold the truck frame against rotation about the truck axle, the transverse transome being offset between its ends toward the axle with its middle part spaced inwardly from the corresponding ends of the wheels pieces.

14. A railway vehicle truck comprising a single axle with wheels and aligned journal boxes, a truck frame with wheel pieces mounted on the journal boxes and elongated lengthwise of the truck, there being a transverse transom rigidly connecting the wheel pieces, said wheel pieces, journal boxes, and transom being held against movement relative to each other, devices at different levels and elongated lengthwise of the truck, each connected at one end to the truck frame and adapted at its other end for connection to a vehicle body mounted on the truck to hold the same against relative movement lengthwise of the truck and to hold the truck frame against rotation about the truck axle, each of said devices being arranged to angle about its end connections to accommodate relative vertical movement between the truck frame and a vehicle body mounted thereon.

15. A railway vehicle truck according to claim 14 in which the devices are positioned at one side of the axle and there is a snubbing device mounted on the truck frame at the opposite side of the axle and extending upwardly therefrom and provided with means for connection to a vehicle body.

16. A railway vehicle truck comprising a single axle with wheels and aligned journal boxes, a truck frame with wheel pieces mounted on the journal boxes and elongated lengthwise of the truck, there being a transverse transom rigidly connecting the wheel pieces, said wheel pieces, journal boxes, and transom being held against movement relative to each other, devices at different levels and elongated lengthwise of the truck, each connected at one end to the truck frame and adapted at its other end for connection to a vehicle body mounted on the truck to hold the same against relative movement lengthwise of the truck and to hold the truck frame against rotation about the truck axle, the wheel pieces forming spring seats at opposite sides of the vehicle axle, and upright springs mounted on said seats and constituting individual supports for a superimposed vehicle body.

17. A railway vehicle truck according to claim 16 in which some of the devices holding the truck frame against rotation about the axle are positioned at the level of and outboard of some of the truck springs.

References Cited in the file of this patent

UNITED STATES PATENTS

| | | |
|---|---|---|
| 981,131 | Spangler | Jan. 10, 1911 |
| 1,348,991 | Gilpin | Aug. 10, 1920 |
| 1,526,410 | Aspinwall | Feb. 17, 1925 |
| 1,831,714 | Latshaw | Nov. 10, 1931 |
| 1,973,816 | Kruckenberg et al. | Sept. 18, 1934 |

FOREIGN PATENTS

| | | |
|---|---|---|
| 253,568 | Germany | Oct. 12, 1911 |
| 923,197 | Germany | Feb. 7, 1955 |
| 708,066 | Great Britain | Apr. 28, 1954 |
| 83,981 | Sweden | July 30, 1935 |